United States Patent Office 3,288,866
Patented Nov. 29, 1966

3,288,866
PLURAL STAGE HYDROGENATION OF ALKE-
NALS TO ALCOHOLS USING COPPER CATALYST
AND THEN PALLADIUM CATALYST
Leslie Ernest Cooper, Hull, England, assignor to The
Distillers Company Limited, Edinburgh, Scotland, a
British company
No Drawing. Filed Mar. 6, 1963, Ser. No. 263,128
Claims priority, application Great Britain, Mar. 15, 1962,
9,895/62
10 Claims. (Cl. 260—638)

The present invention relates to the production of alkanols from unsaturated aldehydes by hydrogenation.

Unsaturated aldehydes which are commercially available for hydrogenation of alkanols contain impurities which render the production of alkanols of satisfactory purity therefrom difficult or impossible by known methods. It is an object of the present invention to provide a process for the production of alkanols from such impure unsaturated aldehydes, which process can provide a product of improved purity.

According to the present invention the process for the production of an alkanol comprises reacting in the vapour phase an olefinically unsaturated aliphatic aldehyde with hydrogen over a supported copper catalyst and reacting the product with further hydrogen over a supported palladium catalyst to convert the olefinically unsaturated aliphatic aldehyde to the alkanol.

The invention may be carried out, for example, by passing a mixture of hydrogen and the vapour of the unsaturated aldehyde over the supported copper catalyst in one reactor and then passing the vaporised product with more hydrogen over the supported palladium catalyst in a second reactor. The invention may also be carried out in one reactor in which the two catalysts are in separate zones of the reactor, the vapour passing first over one catalyst and then over the other catalyst.

The copper catalyst is preferably supported on a siliceous earth such as kieselguhr. The supported catalyst conveniently contains 25% to 90% by weight of copper, based on the total weight of copper and supporting material. The supported copper catalyst may, if desired, contain any of the known modifiers of copper hydrogenation catalysts, for example zinc, magnesium, chromium, iron or compounds of these metals, or a phosphate, tungstate, chromate, dichromate, molybdate, silicate, carbonate or metaborate.

The palladium catalyst is deposited on a support which may be carbon or any other suitable support such as asbestos or kieselguhr. The supported catalyst conveniently contains 0.1% to 10%, preferably 0.25% to 5% by weight of total palladium based on the total weight of palladium and supporting material.

The process of this invention may suitably be carried out in a reactor heated externally to a temperature in the range 130° to 200° C.; if, however, the two stages are carried out in separate reactors, it may in some cases be desirable to operate the reactor containing the supported palladium catalyst at a somewhat lower temperature, though not normally lower than 80° C.

If desired, a nickel containing catalyst may also be employed in the reaction. This catalyst will follow the copper catalyst and when it is used the vapour of the unsaturated aldehyde is preferably reacted with hydrogen in the presence of the copper catalyst to convert at least 80%, and desirably at least 90%, by weight of the unsaturated aldehyde to the alkanol, before reaction over the nickel containing catalyst.

Unsaturated aliphatic aldehydes suitable for use in the process include those having from three to twelve carbon atoms in the molecule. By the process of the invention, for example, crotonaldehyde may be converted to n-butanol, and ethyl propyl acrolein may be converted to 2-ethyl hexanol and acrolein may be converted to propanol.

The following examples further illustrate the invention.

Example 1

A vertical tube reactor was packed to one-fifth of its depth with a composition consisting of palladous hydroxide supported on pellets of carbon (1% w./w. Pd./C) and then the remaining four-fifths of the reactor was packed with a composition consisting of 55.6% by weight of cupric oxide supported on kieselguhr. The reactor was heated to 170° C. and hydrogen was passed to convert the cupric oxide to copper and the palladous hydroxide to palladium. The temperature of the jacket around the catalyst bed was then adjusted to the required level. Ethyl propyl acrolein, prepared by the dehydration of butyraldol, was vaporised and mixed with hydrogen and the mixture was passed in at the top of the reactor. The ethyl propyl acrolein was introduced at a rate equivalent to 0.2 part by volume per hour of liquid ethyl propyl acrolein per part by volume of total catalyst in the reactor. The molar ratio of hydrogen fed to the ethyl propyl acrolein vapour fed was 5:1. The ethyl propyl acrolein was converted into 2-ethyl hexanol. The reaction product was condensed and analysed. The following table indicates the ethyl propyl acrolein and 2-ethyl hexaldehyde contents of the condensate produced at various temperature levels.

| Jacket T., ° C. | Crude Condensate Analysis | |
|---|---|---|
| | Percent Ethylpropyl acrolein | Percent 2-Ethyl-hexaldehyde |
| 140 | 0.11 | 3 |
| 155 | 0.11 | 3 |
| 170 | 0.10 | 2 |

The condensate was distilled and a highly pure 2-ethyl hexanol was obtained. A similarly distilled material obtained by the hydrogenation of the ethyl propyl acrolein over a bed of catalyst containing copper only was unacceptable in quality.

Example 2

Crude ethyl hexanol containing 1.1% of ethyl propyl acrolein, 2.2% 2-ethyl hexaldehyde, 79.6% of 2-ethyl hexanol, the balance being of minor low-boiling and high-boiling impurities was obtained as an impure, reject fraction from a process for producing 2-ethyl hexanol from ethyl propyl acrolein by hydrogenation over a copper catalyst. This fraction was vaporised and passed with hydrogen to a reactor containing activated 1% w./w. palladium on pellet carbon catalyst. The liquid volume feed rate was 0.2 volume per unit volume of catalyst per hour and the corresponding volume ratio of hydrogen was 330. The following table indicates the results of the analysis of the product for ethyl propyl acrolein and residual aldehyde contents.

| Jacket T., ° C. | Crude Condensate Analysis | |
|---|---|---|
| | Percent Ethylpropyl acrolein | Percent 2-Ethyl-hexaldehyde |
| 140 | 0.025 | 1.8 |
| 155 | 0.025 | 2.3 |
| 170 | 0.025 | 2.0 |
| 200 | 0.02 | 1.7 |
| 230 | 0.02 | 0.8 |

The hydrogenate was distilled and a highly pure 2-ethyl hexanol was obtained.

*Example 3*

A reactor bed was charged as indicated in Example 1 with the exception that the copper-kieselguhr catalyst contained 1.5% w./w. of tri-sodium phosphate. The catalysts were activated as in Example 1. The temperature of the jacket was then reduced to 140° C. and crotonaldehyde, prepared by the dehydration of acetaldol, was vaporised, mixed with hydrogen and passed in at the top of the reactor. The crotonaldehyde vapour was introduced at a rate of the equivalent of 0.3 part by volume of liquid crotonaldehyde per part by volume of total catalyst in the reactor. The molar ratio of hydrogen fed to the crotonaldehyde vapour fed was 6:1. The crotonaldehyde was converted to n-butanol. The reaction product was passed as vapour from the base of the reactor and was then condensed. The condensate was n-butanol together with 1.7% by weight of n-butyraldehyde and less than 0.015% by weight of crotonaldehyde.

The condensate was distilled and highly pure n-butanol was produced.

In contrast with the hydrogenation of this example, when the same procedure was carried out using the reactor packed entirely with the copper/kieselguhr catalyst containing the alkali metal phosphate, the reaction product was condensed to form n-butanol containing 15% by weight of n-butyraldehyde, 0.1% by weight of crotonaldehyde and 1% by weight of crotyl alcohol. This condensate was distilled by a method identically similar to that used to recover purified n-butanol prepared over the copper and palladium catalysts in this example, but the n-butanol prepared had an unacceptable quality due to the presence of unremoved impurities.

*Example 4*

Five samples of ethyl propyl acrolein were hydrogenated in the manner of Example 1 using various combinations of catalyst; in four cases three different catalysts were used within the same tubular reactor. The results are summarised in Table 1, which shows the nature of the catalysts, the reaction conditions and the impurities in the product. In all cases the product was a highly pure 2-ethylhexanol.

In Table 1, the catalysts are referred to by reference letters, the key to which is as follows:

(a) 55.6% w./w. cupric oxide supported on kieselguhr,
(b) Palladous hydroxide supported on pellets of carbon, and containing 0.5% by weight of palladium.
(c) A mixture of 5.6% w./w. nickel oxide (NiO) and 56.3% cupric oxide supported on kieselguhr.
(d) Palladous hydroxide supported on pellets of carbon and containing 1.0% by weight of palladium.

Included for comparison are the results of hydrogenating a sample of ethyl propyl acrolein under similar conditions, using catalyst (a) above.

TABLE 1

| Example No. | Catalyst Bed Charge (parts by volume) | Vols. Liquid feed/vol. Catalyst hour | Reactor Jacket T., ° C. | $H_2$:—C=C— Molar Ratio | Crude Condensate Analysis | |
|---|---|---|---|---|---|---|
| | | | | | Percent Ethyl Propyl Acrolein | Percent 2-Ethyl Hexaldehyde |
| A | 1 Catalyst (a) 120 parts<br>2 Catalyst (b) 30 parts | 0.2 | 155 | 5:1 | 0.2 | 2.5 |
| B | 1 Catalyst (a) 100 parts<br>2 Catalyst (b) 25 parts<br>3 Catalyst (d) 30 parts | 0.2 | 155 | 5:1 | 0.05 | 1.2 |
| C | 1 Catalyst (a) 80 parts<br>2 Catalyst (c) 35 parts<br>3 Catalyst (d) 35 parts | 0.2 | 155 | 5:1 | 0.02 | 0.9 |
| D | 1 Catalyst (a) 90 parts<br>2 Catalyst (d) 30 parts<br>3 Catalyst (c) 30 parts | 0.2 | 155 | 5:1 | 0.02 | 0.9 |
| E | 1 Catalyst (a) 100 parts<br>2 Catalyst (c) 20 parts<br>3 Catalyst (d) 30 parts | 0.2 | 155 | 4:1 | 0.01 | 0.8 |
| Comparative | 1 Catalyst (a) 150 parts | 0.2 | 155 | 5.7:1 | 0.42 | 3.8 |

*Example 5*

Three samples of crotonaldehyde were hydrogenated in the manner of Example 4 using various combinations of catalysts. The results are summarised in Table 2, which is in similar form to Table 1. The reference letters to the catalysts have the same key as in Example 4 with the addition of:

(e) 55.6% w./w. cupric oxide supported on kieselguhr and containing additionally 1.5% w./w. of trisodium phosphate.

The product in each case was a highly pure n-butanol.

TABLE 2

| Example No. | Catalyst Bed Charge (parts by volume) | Vols. Liquid feed/vol. Catalyst hour | Reactor Jacket T., ° C. | $H_2$:—C=C— Molar Ratio | Crude Condensate Analysis | |
|---|---|---|---|---|---|---|
| | | | | | Percent Ethyl Propyl Acrolein | Percent 2-Ethyl Hexaldehyde |
| A | 1 Catalyst (e) 120 parts<br>2 Catalyst (d) 30 parts | 0.29 | 140 | 6.5:1 | 0.007 | 4.0 |
| B | 1 Catalyst (e) 100 parts<br>2 Catalyst (d) 20 parts<br>3 Catalyst (c) 30 parts | 0.27 | 140 | 7:1 | 0.004 | 0.5 |
| C | 1 Catalyst (e) 90 parts<br>2 Catalyst (d) 20 parts<br>3 Catalyst (c) 40 parts | 0.3 | 140 | 6:1 | 0.009 | 0.7 |

I claim:

1. The process for production of an alkanol which comprises reacting an olefinically unsaturated aliphatic aldehyde having from three to twelve carbon atoms in the molecule in the vapor phase with an excess of hydrogen at a temperature of from 130° to 200° C. over a heated supported copper catalyst wherein at least 80% of the aldehyde is converted to the alkanol, and subsequently reacting the vaporized product with an excess of hydrogen at a temperature of 80° to 200° C. over a heated supported palladium catalyst to convert the olefinically unsaturated aliphatic aldehyde to the alkanol.

2. The process as claimed in claim 1 in which the copper catalyst is supported on kieselguhr.

3. The process as claimed in claim 1 in which the copper catalyst contains from 25% to 90% by weight of copper based on the total weight of catalyst and support.

4. The process as claimed in claim 1 in which the copper catalyst contains a proportion of a modifier selected from the group consisting of zinc, magnesium, chromium, iron, compounds of these metals, and metal phosphates, tungstates, chromates, dichromates, molybdates, silicates, carbonates and metaborates.

5. The process as claimed in claim 1 in which the palladium catalyst is supported on a material selected from the group consisting of carbon, asbestos and kieselguhr.

6. The process as claimed in claim 1 in which the palladium catalyst contains from 0.25% to 5% by weight of palladium based on the total weight of palladium and catalyst support.

7. The process as claimed in claim 1 in which the reactants are passed over a heated supported nickel catalyst in addition to the supported palladium catalyst and after passage over the supported copper catalyst.

8. The process as claimed in claim 1 in which the unsaturated aliphatic aldeyhde is crotonaldehyde.

9. The process as claimed in claim 1 in which the unsaturated aliphatic aldehyde is ethyl propyl acrolein.

10. The process as claimed in claim 1 in which the unsaturated aliphatic aldehyde is acrolein.

References Cited by the Examiner
UNITED STATES PATENTS

| | | | |
|---|---|---|---|
| 1,724,761 | 8/1929 | Holden | 260—638 |
| 2,119,899 | 6/1938 | Zorn et al. | 260—638 |
| 2,517,916 | 8/1950 | Pavlic | 260—638 |
| 2,825,743 | 3/1958 | Maclean et al. | 260—638 |
| 3,118,954 | 1/1964 | Robbins et al. | 260—638 |

LEON ZITVER, *Primary Examiner.*

M. B. ROBERTO, J. E. EVANS, *Assistant Examiners.*